(12) United States Patent
Jain et al.

(10) Patent No.: US 7,454,639 B2
(45) Date of Patent: Nov. 18, 2008

(54) VARIOUS APPARATUSES AND METHODS FOR REDUCED POWER STATES IN SYSTEM MEMORY

(75) Inventors: Sandeep Jain, Milpitas, CA (US); James P. Kardach, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 400 days.

(21) Appl. No.: 11/174,060

(22) Filed: Jun. 30, 2005

(65) Prior Publication Data

US 2007/0005998 A1 Jan. 4, 2007

(51) Int. Cl.
*G06F 1/00* (2006.01)
*G06F 1/26* (2006.01)
*G06F 1/32* (2006.01)

(52) U.S. Cl. .................. 713/324; 713/300; 713/320; 713/323

(58) Field of Classification Search ............ 713/300, 713/320, 323, 324
See application file for complete search history.

(56) References Cited

U.S. PATENT DOCUMENTS

| 6,708,278 | B2 * | 3/2004 | Howard et al. |
| 6,727,952 | B1 * | 4/2004 | Hirata et al. |
| 6,820,169 | B2 * | 11/2004 | Wilcox et al. ............... 711/105 |
| 7,003,639 | B2 * | 2/2006 | Tsern et al. ................. 711/154 |

OTHER PUBLICATIONS

US SN, 11/173,784, Office action dated Oct. 4, 2007.*
US SN, 11/173,784, Office action dated Apr. 10, 2008.*

* cited by examiner

*Primary Examiner*—Rehana Perveen
*Assistant Examiner*—Michael J Brown
(74) *Attorney, Agent, or Firm*—Blakely, Sokoloff, Taylor & Zafman LLP

(57) ABSTRACT

A method, apparatus, and system are described in which a memory controller may have two or more registers to create and track zones of memory in a volatile memory device. The memory controller controls a power consumption state of a first zone of memory in the volatile memory device and a second zone of memory within the first volatile memory device on an individual basis; and one or more memory arrays contained within the first volatile memory device.

21 Claims, 6 Drawing Sheets

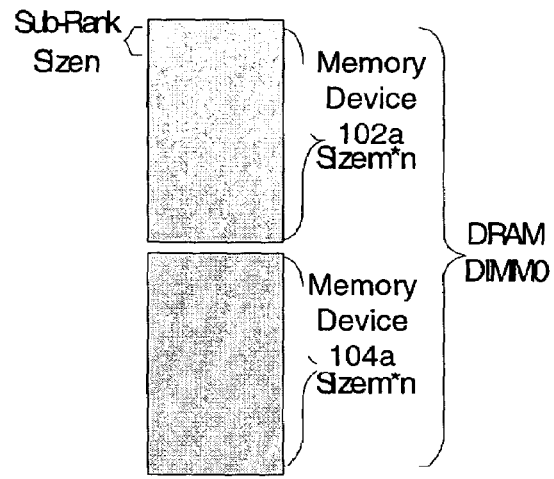
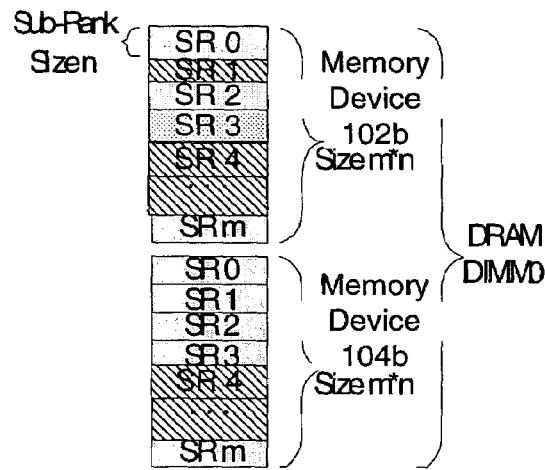
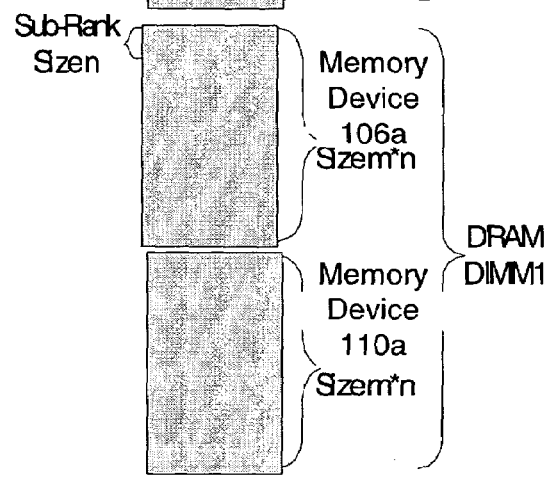
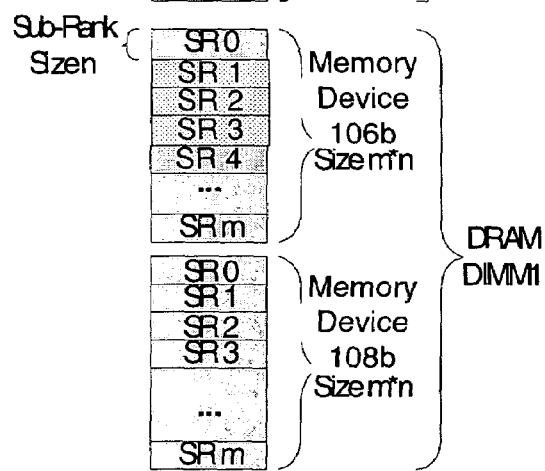
Figure 1A
Figure 1B

VARIOUS APPARATUSES AND METHODS FOR REDUCED POWER STATES IN SYSTEM MEMORY

FIELD

Aspects of embodiments of the invention relate to the field of power management; and more specifically, to the power management of a memory.

BACKGROUND

Some system devices, such as memory, may operate in various power consumption modes such as active, standby, and off. These power consumption modes of these devices coincide with and are globally controlled by the power consumption mode of the overall system. If the entire system is off, then all of the components of the system such as disk drives, processors, and volatile memories are also powered off. If the entire system is in a standby mode, then most of the components in the system are in a reduced power consumption mode. If the entire system is in an active mode, then all of the components in the system are in a fully powered up state.

BRIEF DESCRIPTION OF THE DRAWINGS

The drawings refer to embodiments of the invention in which:

FIGS. 1A and 1B illustrate block diagrams of an embodiment of the system's volatile memory having four memory devices on two memory cards in two Dual In-Line Memory Module (DIMM) slots in a computing device;

Figure 2:
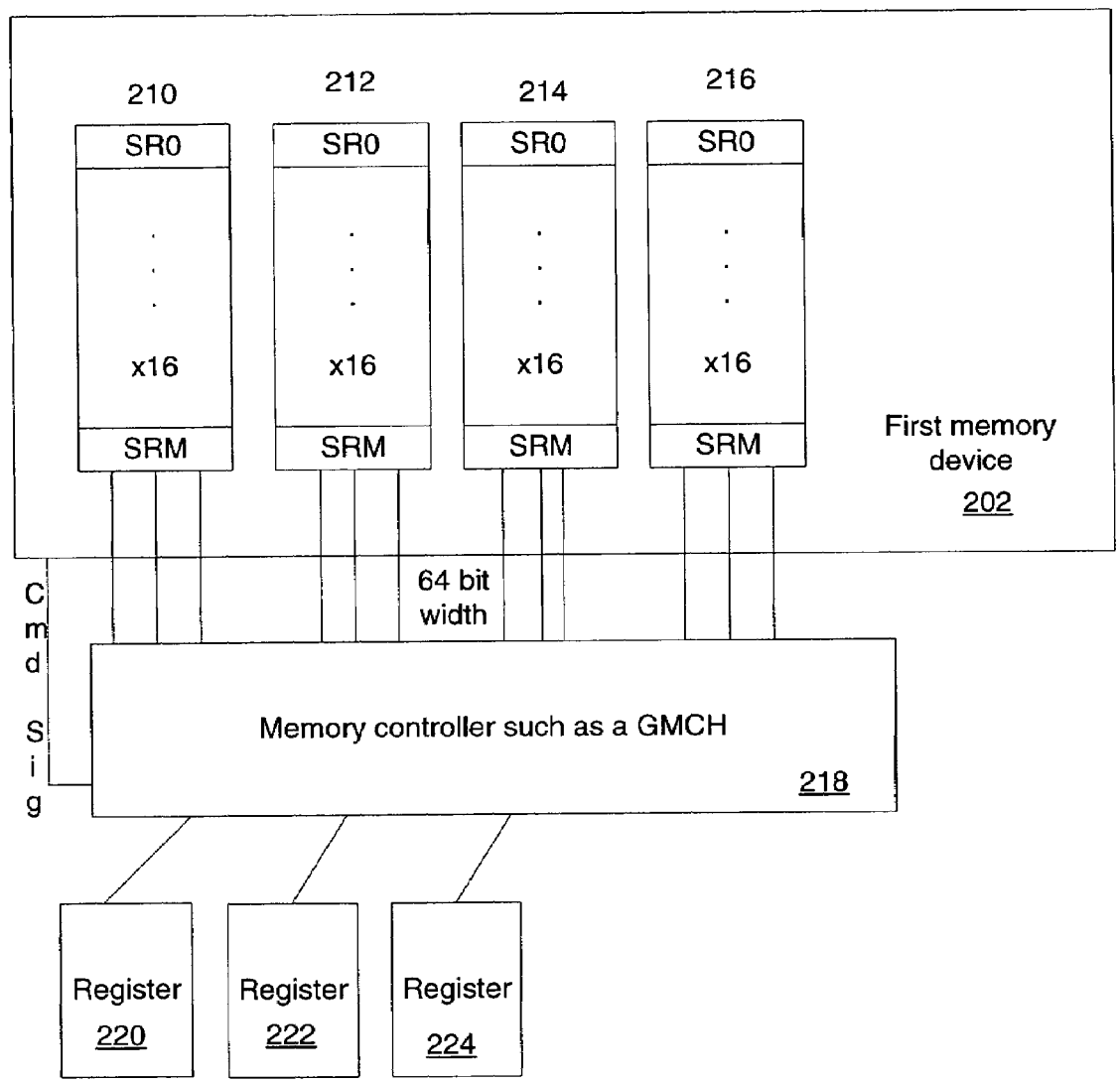
FIG. 2 illustrates a block diagram of an embodiment of a memory device having four memory arrays with one or more memory zones that allow designation of the power consumption state of each zone on an individual basis and are formed over the memory arrays.

While the invention is subject to various modifications and alternative forms, specific embodiments thereof have been shown by way of example in the drawings and will herein be described in detail. The embodiments of the invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific data signals, named components, connections, types of power consumption states, etc., in order to provide a thorough understanding of the embodiments of the invention. It will be apparent, however, to one of ordinary skill in the art that the embodiments of the invention may be practiced without these specific details. The specific numeric reference should not be interpreted as a literal sequential order but rather interpreted that the first register is different than a second register. Thus, the specific details set forth are merely exemplary. The specific details may be varied from and still be contemplated to be within the spirit and scope of the present invention.

In general, various methods, apparatuses, and systems are described in which each memory controller may have two or more registers that create and track zones of memory formed within the system volatile memory devices. Each memory controller controls one or more zones of memory within each volatile memory device to transition between various power consumption states on an individual basis. Each volatile memory device may contain one or more memory arrays. The memory controller may also determine whether each zone of memory is available for use by the operating system. Zones of memory not available for use by the operating system may be completely powered off to save on power consumption.

FIGS. 1A and 1B illustrate block diagrams of an embodiment of the system's volatile memory having four memory devices on two memory cards in two Dual In-Line Memory Module (DIMM) slots in a computing device. Referring to FIG. 1A, the first volatile memory card may have two volatile memory devices, such as Dynamic Random Access Memory (DRAM), Double Data Rate RAM (DDR RAM), and other similar volatile memory types. The two volatile memory devices, the first memory device 102a and the second memory device 104a, may connect into the DIMM0 slot. The second volatile memory card may have two more volatile memory devices, 106a and 110a, that connect into the DIMM1 slot. The entire volatile memory may be turned on and turned off depending upon the power consumption mode of the computing device.

The FIG. 1A shows the same volatile memory DIMM configurations as FIG. 1B. Thus, the first volatile memory card may have two volatile memory devices, the first memory device 102b and the second memory device 104b, that may connect into the DIMM0 slot. The second volatile memory card may have two more volatile memory devices, the third memory device 106b and the fourth memory device 108b, that may connect into the DIMM1 slot.

Each volatile memory device 102b-108b has zones of memory formed within the system's volatile memory devices. Each of the zones can be individually controlled from a first power consumption state, such as actively powered, to a second power consumption state, such as stand-by. The first memory device 102b may consist of many zones of memory formed in this volatile memory device. The zones of memory may consist of the initial zone of memory SR0 through a last zone of memory SRM in the first memory device 102b. Similarly, the second memory device 104b may be sub-divided into zones of memory consisting of an initial zone of memory SR0 through a last zone of memory SRM. The third memory device 106b and the fourth memory device 108b may also be organized with zones of memory in each memory device.

Thus, multiple zones of memory may be formed in the volatile memory devices 102b-108b. Each zone of memory can be individually controlled to transition from an initial power consumption state to another power consumption state. Accordingly, multiple power states may exist within the same volatile memory device. The following example zones of memory formed in a memory device will illustrate this concept.

Merely zones of memory SR0 and SR2 in the first memory device 102b are set to operate in an active full power consumption state. Similarly, zones of memory SR0 through SR3 and SRM in the second memory device 104b are set to operate in an active full power consumption state. Zones of memory SR0 and SR4 through SRM in the third memory device 106b are set to operate in an active full power consumption state. All of the memory zones in the fourth memory device 108b are set to operate in an active full power consumption state.

However, zone of memory SR3 in the first memory device 102b is not powered at all, and is in fact powered off. Similarly, zone of memory SR1 thru zone of memory SR3 in the third memory device 106b are also set to operate in a fully reduced power consumption state.

Finally, zone of memory SR1 in the first memory device 102b is set to operate in a reduced power consumption stand-by mode. Similarly, zone of memory SR4 through zone of memory SRM-1 in the second memory device 104b are set to operate in a reduced power stand-by mode.

Thus, a memory device such as the first memory device 102b may have various zones of memory that are set to operate in a reduced power consumption state such as powered off or stand-by, while other portions of the first memory device 102b may be set to operate in an active full power consumption state.

In an embodiment, the memory device can be virtually mapped into several memory zones. Each zone can be identified by choosing a specific size, and then by choosing a sub-rank of size N. A size N may be kept fixed based on optimum page size requirements of the Operating System (OS). The OS may request data or instructions of memory units in the page size requirement. The total storage capacity of a memory device, i.e. size, may be measured in, for example, mega-bytes. The total size of a specific volatile memory device may be the sum of the size of each of the zones.

Different example hardware devices and OS schemes are going to be described to execute these zones of memory and power consumption states. The power consumption management state of each zone can be put under either the OS control, under an OS supported power management application, as an Advanced Configuration and Power Interface (ACPI), or under the hardware control in, for example, a graphics and memory controller. Either way, the system can power manage these virtual memory zones in the same memory device.

The memory devices are defined as being able to have a context loss associated with the various sleep states. Whenever an entire volatile memory or portions of that volatile memory are not being used, the context of the effected portions of that memory can be stored to a hard disk. The power can then be removed from the effected portions of that volatile memory.

FIG. 2 illustrates a block diagram of an embodiment of a memory device having four memory arrays with one or more memory zones that allow designation of the power consumption state of each zone on an individual basis and are formed over the memory arrays. Each of the memory arrays, the first memory array 210 through the fourth memory array 216, couple to a memory controller 218. The memory controller 218 may control each individual zone of memory and the power consumption states associated with each zone of memory formed within the four volatile memory arrays 210-216. For example, the first memory array 210 may include an initial zone of memory SR0 through the last zone of memory SRM. The memory controller 218 may have two or more registers, such as a first register 220 and a second register 222, to create and track the zones of memory formed within the volatile memory device 202.

Each zone of memory may span across the memory arrays because that is generally how the system's memory works with its relationship to the memory device. For example, when the memory controller 218 fetches a 64 bit word from the volatile memory device 202, then 16 bytes come from the first memory array 210, another 16 bytes come from the second memory array 212, and so on until the last 16 bytes of the 64-bit word comes from the fourth memory array 216. Other memory zone formations may be possible such as a single zone of memory being contained within a single memory array or spanning across multiple memory devices.

Additionally, each zone of memory may be formed with an equal storage capacity compared to other zones or a different storage capacity compared to other zones. Thus, the zones of memory may be of equal sizes or may be of different size zones of memory.

The memory controller 218 may set up the control of power consumption state and operating system usage of these memory zones. The memory controller 218 may have a number of registers associated with that memory controller 218. As discussed, the memory controller 218 may have two or more registers that construct and track zones of memory formed within each system volatile memory device 202 that can be individually powered down from a first power consumption state to a second power consumption state. The memory controller 218 may use a first register 220 to track information such as a starting address of each zone of memory in the volatile memory device 202. The memory controller 218 may use a second register 222 to track information such as the address length/size of each zone of memory in the volatile memory device 202. The memory controller 218 may use a third register 224 to track information such as the whether each zone of memory is available for use by an operating system. The memory controller 218 may use other registers to establish a threshold level of use of the system's volatile memory to determine whether to make portions of the volatile memory device available for use by the operating system. The memory controller 218 may use more registers to establish a threshold level of use of the system's volatile memory to trigger the transition of each zone of memory from the first power consumption state to a second power consumption state. The memory controller 218 may define these zones and then send one or more command signals to the volatile memory device 202 that will then be translated to create the zones of memory within the volatile memory device 202.

The memory controller 218 may have an input configured to receive a signal to set the power consumption state of each zone of memory in one of the configuration registers 220-224. The signal may be generated from an operating system power management interface, such as ACPI, that lists each zone of memory formed in the volatile memory device 202 as a discrete device. The memory controller 218 may control local device power consumption states such as Off (D3), D2, D1, and Fully-On (D0) as defined by the Advanced Configuration and Power Interface (ACPI) Specification, Revision 2.0a dated Mar. 31, 2002 (and published by Compaq Computer Corporation, Intel Corporation, Microsoft Corporation, Phoenix Technologies Ltd., and Toshiba Corporation).

Figure 3:
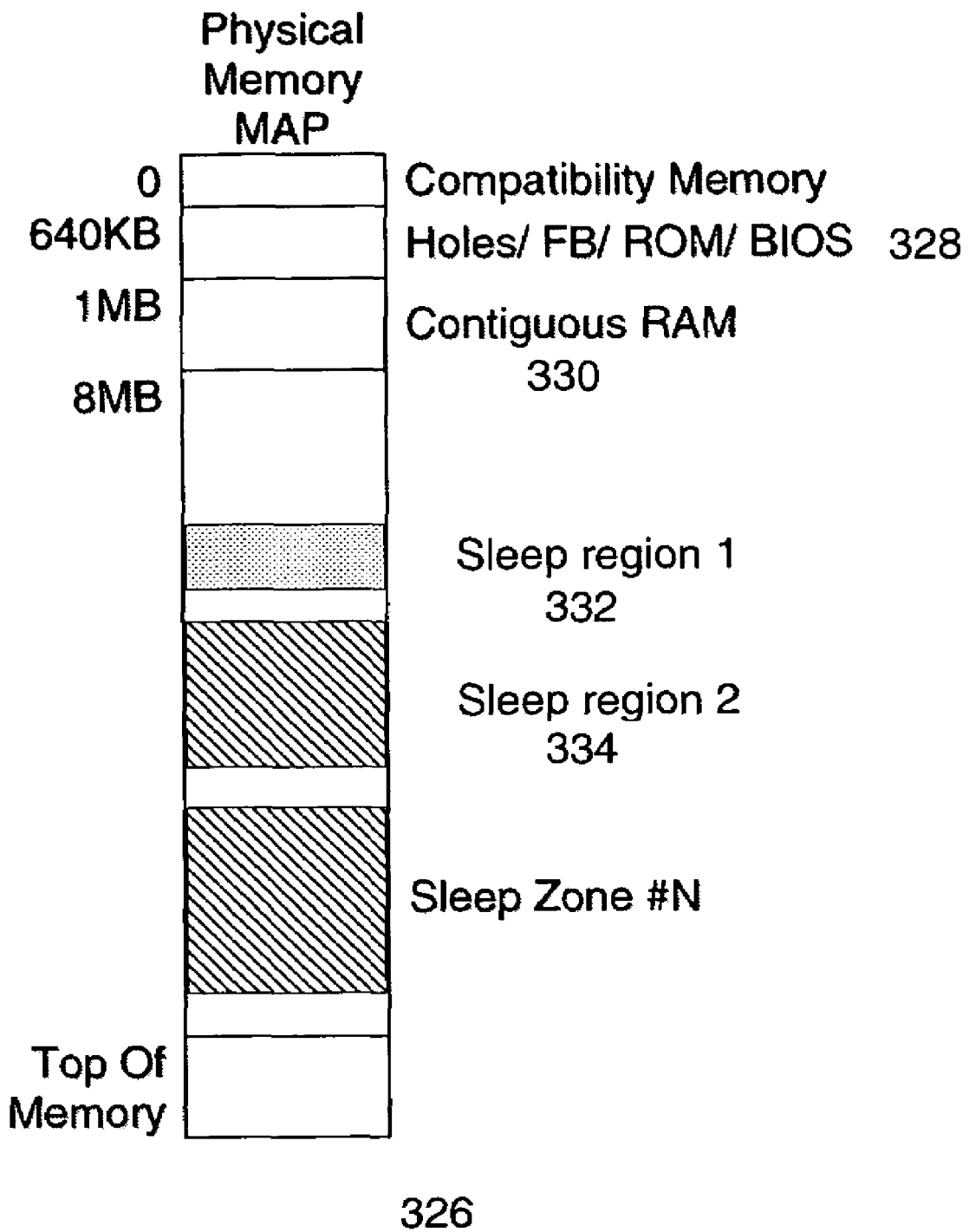
FIG. 3 illustrates an embodiment of a physical mapping of the entire volatile system memory of the computing device from an operating system perspective.

FIG. 3 illustrates an embodiment of a physical mapping of the entire volatile system memory of the computing device from an operating system perspective. FIG. 1 illustrated a physical mapping of each memory device in a specific memory slot in the computing device from a hardware perspective. All four memory devices, which are given herein as an example number of memory devices, may connect sequentially together to form the system's volatile memory 326. The various grouping of zones of memory may be actively powered, put in one or more standby modes, or powered off; however, they do not have to be physically or logically continuous or sequentially numbered areas that are put to sleep.

For example, the operating system power management interface reserves a first portion 328 of the system's volatile memory 326 from the 0 to 640 kilobytes area for compatibility memory and the Basic Input Output System functions. The operating system power management interface reserves a second portion 330 of the system's volatile memory 326 up to the first megabyte of contiguous RAM and is generally kept in an active full power consumption state when the computing device is operating in an active full power consumption state. The operating system power management interface may place the next few portions of the system volatile memory 326 in various power consumption modes, such as the third portion 332 is completely powered off and the fourth portion 334 may be in a standby reduced power consumption mode.

The first portion 328 of the system's volatile memory 326 that is actively powered may, for example, correspond to a number of the zones of memory that are set to be actively powered in the third memory device 106b. The third portion 332 of the system's volatile memory 326 that is powered off may, for example, correspond to the zone of memory SR3 in the first memory device 102b and zones of memory SR1 and SR3 in the third memory device 104b. The fourth portion 334 of the system's volatile memory 326 that is in a standby reduced power consumption mode may correspond to the zones of memory SR1 and SR4 through SRM-1 that are set to operate in a stand-by state in the first memory device 102b. The physical memory map of the OS is not restricted to keep the various power consumption zones tied together in a specific sequential order.

Either the Operating System, an OS supported power management interface, or the memory controller or a combination of the three can create and track these memory zones. As discussed above, the memory controller may create and track the zones, where each register can determine what the starting address is of each zone, how long that zone is, etc. The memory controller can control the power consumption states of the zones of memory formed within the first volatile system memory device on an individual basis.

In an alternative embodiment, the operating system through an OS power management interface, such as an Advanced Configuration and Power Interface (ACPI) interface, may control the consumption states on an individual basis.

Figure 4:
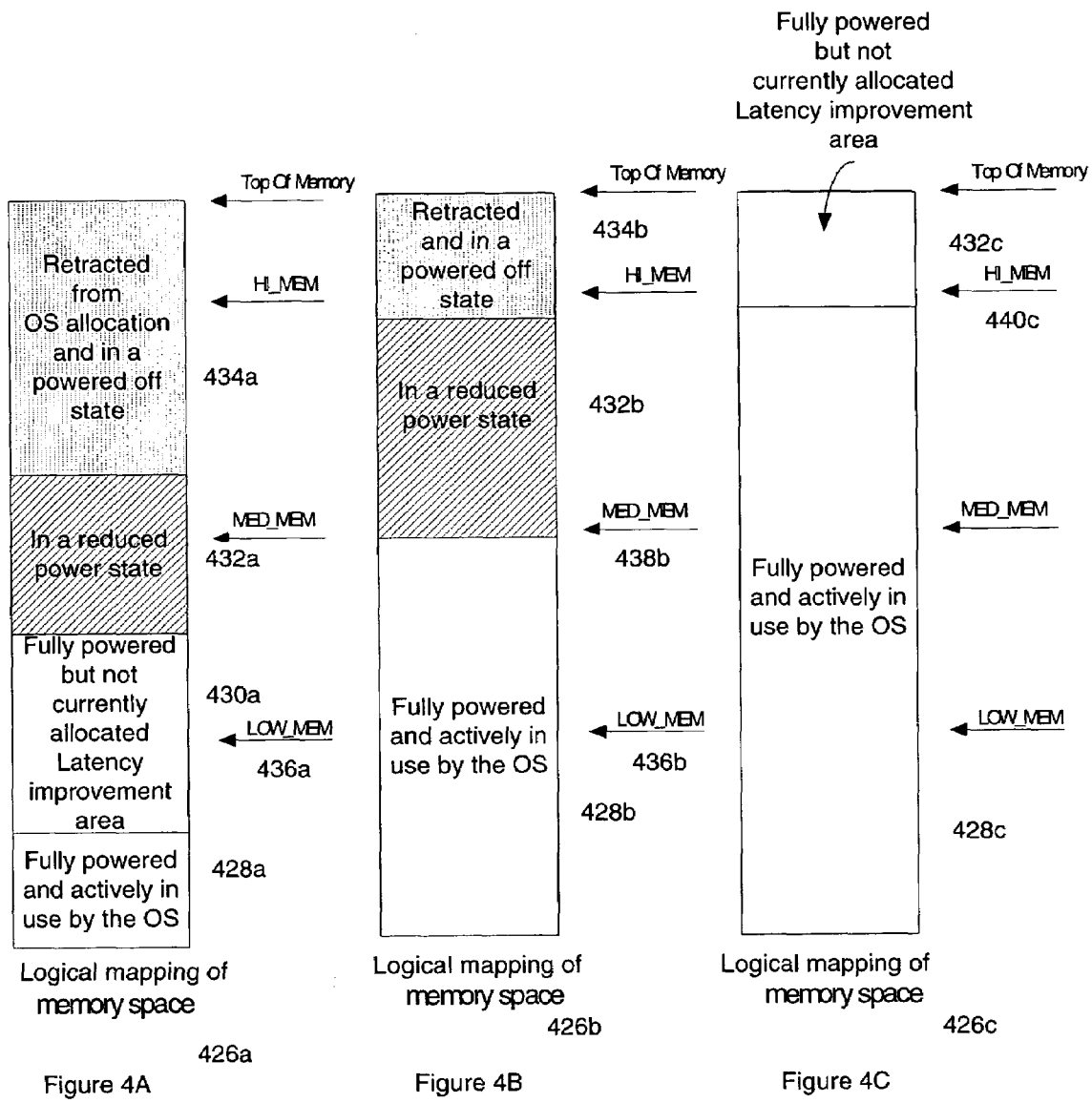
FIGS. 4A-4C show various embodiments of a logical mapping of the system's volatile memory space with various thresholds established to trigger a transition of portions of the system's volatile memory between power consumption states.

FIGS. 4A-4C show various embodiments of a logical mapping of the system's volatile memory space with various thresholds established to trigger a transition of portions of the system's volatile memory between power consumption states.

FIG. 4A shows four portions 428A-434A of logically mapped system's volatile memory space 426a. The first portion 428a is set to operate in an active full power consumption state corresponding to N number of memory zones allocated to be in current use by the OS. The second portion 430a is set to operate in an active full power consumption state corresponding to N number of memory zones that are not currently allocated for use by any particular application by the OS. The function of the second portion 430a may be to improve latency in the system. Even though the OS has not allocated the zones of memory to be used by a running application, the OS may reserve the zones of memory corresponding to the second portion 430a of the system's volatile memory space 426a to be fully powered just in case an application needs more memory area allocated or a new application starts up immediately. The power consumption states for the zones of memory in the third portion 432a in the logical mapping of the system's volatile memory space 426a may be set to operate in a reduced power state, such as stand-by. The power consumption states for the zones of memory in the fourth portion 434a may be set to operate in a reduced power state, such as powered off. These zones of memory are effectively retracted from the OS allocation until a threshold is triggered to transition these zones to a higher power consumption state. From the OS's perspective, this portion of the system's volatile memory space 426a in a powered off state does not exist for memory allocation purposes. In an embodiment, the OS power management interface or the memory controller may retract a portion of the system's volatile memory 426a from use by the OS until a threshold level of usage of the system's volatile memory is achieved.

Figure 5:
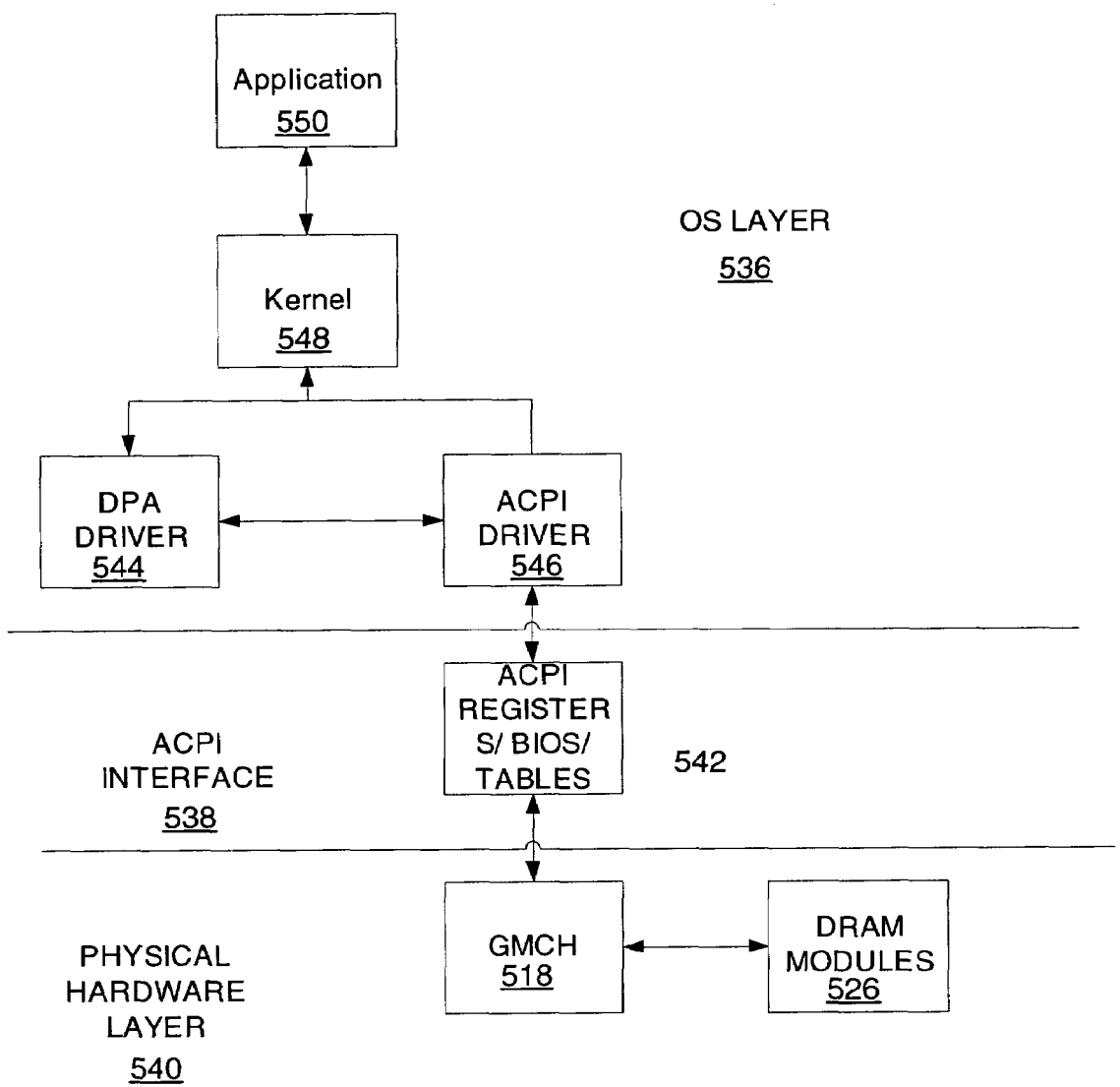
FIG. 5 illustrates a multiple layer Operating System (OS) to hardware perspective of working with an embodiment of a volatile memory system that has multiple zones that may have different power consumption states within the same memory device.

Skipping briefly to FIG. 5, FIG. 5 illustrates a multiple layer OS to hardware perspective of working with an embodiment of a volatile memory system that has multiple zones that may have different power consumption states within the same memory device. The OS to hardware relationship may consist of three layers: the OS layer 536; the OS power management interface layer 538 such as an ACPI interface; and a physical hardware layer 540. On the physical hardware layer 540 resides the memory controller 518, such as a Graphics Memory Controller Hub, and the memory module(s) 526 that contain the memory devices themselves, such as DRAM modules.

The OS power management interface layer 538 may consist of an ACPI register with BIOS tables 542. The OS power management interface layer 538 may make hardware status information available to the OS. The OS power management interface layer 538 enables the computing device to turn its peripheral devices on and off. The OS power management interface layer 538 may treat each zone of memory formed within the system volatile memory 526 as a discrete device listed in the ACPI interface. The OS power management interface layer 538 may also designate the threshold levels to trigger when each zone of memory should transition power consumption states based on the system's current and/or forecasted volatile memory usage.

The OS power management interface 538, such as the ACPI interface, may use control methods. The control methods may signal the controller 518 to place the zones of memory in the various power consumption states. The OS power management interface 538 enables the computing device to turn the memory zones on and off like peripheral devices for improved power management especially in portable devices. The OS power management interface 538 may also allow the computing device to be turned on and off by external devices, so that, for example, the touch of a mouse or the press of a key will "wake up" the computing device.

The OS layer 536 may have one or more volatile memory power adapter drivers 544, such as a DRAM power adapter driver, one or more OS power management drivers 546, such as an ACPI driver, one or more kernels 548, and one or more applications 550 running on the OS. The volatile memory power adapter driver 544 runs under the OS kernel 548 and interacts with the OS power management driver 546 and ACPI register 542 to put different zones of memory in the various power consumption states. The OS may treat the volatile memory power adapter driver 544 requests in a special way so that the volatile memory power adapter driver 544 can request memory allocation of portions of the volatile memory from the OS. The OS indefinitely blocks out these portions from use by other applications until a threshold is achieved.

In an embodiment, if the OS is controlling the power states of the zones of memory created within the same memory, then the OS may work with a sub-program called a Memory Power Adapter Application. The Memory Power Adapter Application may make a call of a memory allocation to specify the desired size of the system's volatile memory space to reserve. The OS locates that block of memory of the desired size that is not currently in use and reserves that portion of the memory for the Memory Power Adapter Application. The OS returns the start address of the assigned memory block to the volatile memory power adapter driver 544. The volatile memory power adapter driver 544 then determines the memory zones that are affected by the OS's decision to retract them and informs the OS power management interface 538 to put that device or at least some memory zones in that device into a reduced power consumption mode. The memory controller 518 then receives the sleep instructions and puts each memory zone in the system volatile memory 526 into its specified reduced power consumption state.

Note, when each zone of memory is put into a reduced power consumption mode, being that its volatile memory, that zone of memory may suffer some context loss. In one embodiment, the context of the volatile memory may be saved to the non-volatile memory, such as a hard disk.

The OS power management application may forecast memory requirements to put unused memory spaces into sleep modes. A system utility may determine the system activity and memory usage requirements using a performance monitor. The use of the level of memory can be checked by referencing the OS or by looking at the Input Output controller in hardware. The system utility may then determine the optimum physical memory size requirements. Based on these requirements, as OS virtual memory manager, or in an alternative embodiment, the hardware memory controller can lock out certain portions of the system's volatile memory from the applications 550 use until the OS really runs out of resources.

Referring back to FIG. 4A, in operation, the OS power management interface through code or the memory controller chip-set through logic and hardware, such as registers and command signals, may also create threshold levels to control the different power consumption states in the logical mapping of the system's volatile memory space 426a. The memory thresholds may be set to transition selected portions of the physical memory from a first lower state of power consumption to a second higher state of power consumption based upon achieving (i.e. being equal to or greater than) a given threshold level of use of the system's volatile memory. The level of use of the system's volatile memory can be checked by referencing the OS or by looking at the Input Output controller in hardware.

In the logical mapping of memory space shown in FIG. 4A, the thresholds are set and the reserved portions of the memory are established such that latency should not be impacted based upon the current memory usage and forecasted amount of memory usage. The first portion 428a illustrates the current actual level of memory allocated for use in the system by the OS. The first portion 428a is below the low-level memory threshold 436a. Thus, even though the active level of use of memory in the system is below the low-level memory threshold 436a, a buffer zone of fully powered but not yet allocated portions of the memory exists in the second portion 430a which are powered up just in case the zones of memory are needed to ensure that the latency is not decreased by this power reduction system. The second portion 430a may be established based on forecasted/anticipated memory usage needs. The fourth portion 434a of the system's volatile memory space 426a may be established and powered off based on the actual memory usage being lower than the low-level memory threshold 436a.

However, FIG. 4B shows a system that is more concerned with power then latency. There is no fully powered buffer zone of actively powered zones of memory. The first portion 428b is set to operate in an active full power consumption state corresponding to N number of memory zones allocated to be in current use by the OS. The second portion 432b is set to operate in a reduced power consumption state, such as stand-by. The third portion 434b is set to operate in a reduced power consumption state, such as powered off. The three states of memory zones exist in the system's volatile memory: either zones of memory corresponding to a portion of the memory in a fully powered and active use state; zones of memory corresponding to a portion of the memory in a standby state; and zones of memory retracted from the OS allocation in a powered off state. The zones of memory that are actively being used and allocated by the OS are just below the medium memory threshold 438b and above the low memory threshold 436b. The third portion 434b may be set to operate in a powered off state based on the actual memory usage being lower than the medium-level memory threshold 438b.

FIG. 4C shows the system's volatile memory formed into two portions. The first portion 428c is set to operate in an active full power consumption state corresponding to N number of memory zones allocated to be in current use by the OS. The first portion 428c rises to a level of memory usage just below the high memory threshold 440c. This embodiment is also latency sensitive. Thus, the remainder of the zones of memory in the second portion 432c are placed in a fully powered, but not currently allocated state.

Accordingly, each of these portions of the physical memory corresponding to zones of memory can be transitioned when each of these thresholds, i.e. watermark levels, are achieved. When these threshold levels are achieved, then more zones of memory are allocated to be in an actively powered state, and removed from their reduced power consumption state.

In an embodiment, the reduced power consumption states may be defined by the ACPI standard originally published in 2002. The ACPI standard is a power management specification developed by a combination of companies including Intel, Toshiba and Microsoft that makes hardware status information available to the operating system.

The computing device may be for example a lap top computer, a personal digital assistant, a cellular phone, or other device powered by a battery.

Figure 6:
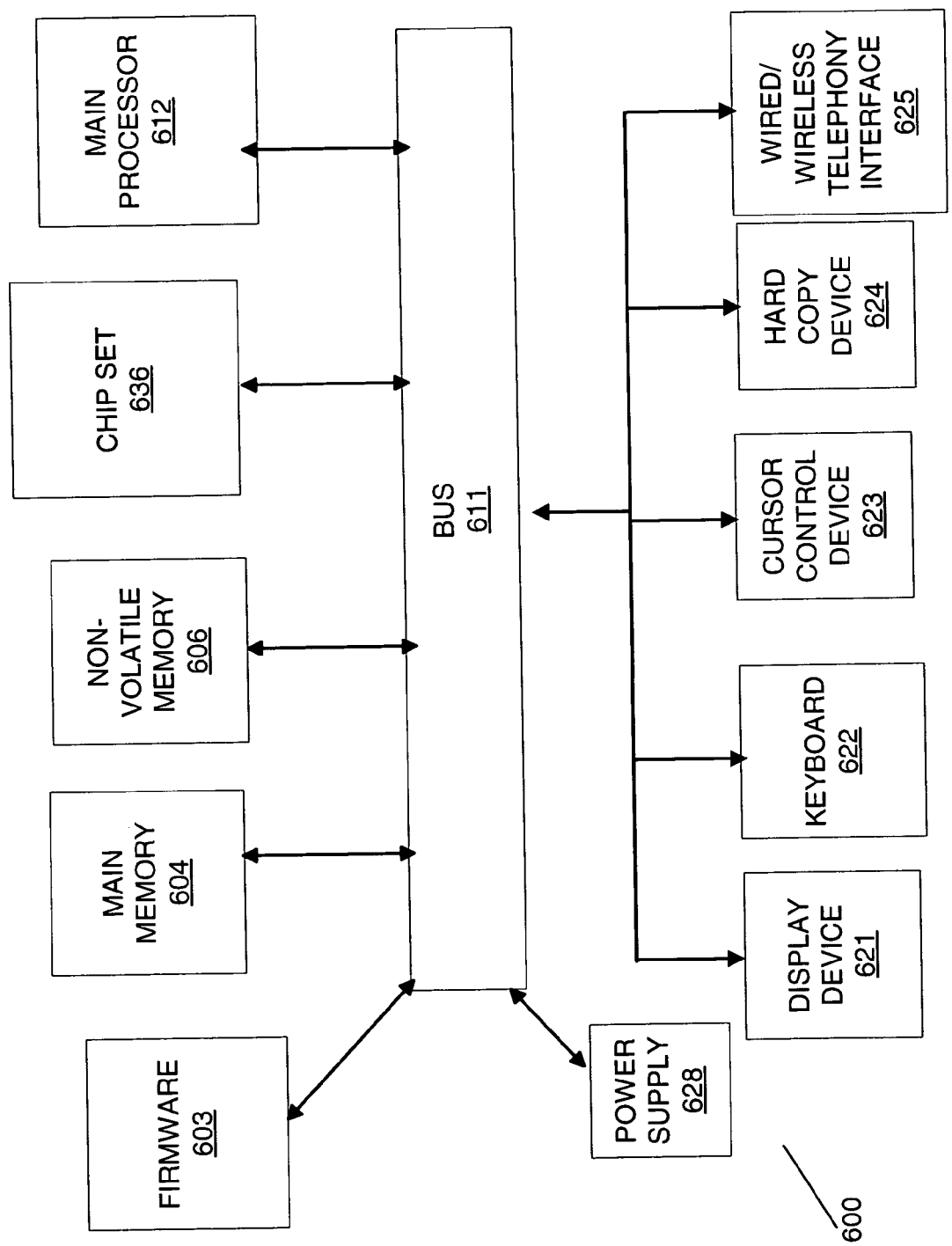
FIG. 6 illustrates a block diagram of an example computer system that may use an embodiment of a chipset that includes one or more controllers to create zones of memory in the volatile memory devices that can be individually controlled to transition from a first power consumption state to a second power consumption state.

FIG. 6 illustrates a block diagram of an example computer system that may use an embodiment of a chipset that includes one or more controllers to create zones of memory in the volatile memory devices that can be individually controlled to transition from a first power consumption state to a second power consumption state. In one embodiment, computer system 600 comprises a communication mechanism or bus 611 for communicating information, and an integrated circuit component such as a main processing unit 612 coupled with bus 611 for processing information. One or more of the components or devices in the computer system 600 such as the main processing unit 612 or a chip set 636 may use an embodiment of the controllers that create zones of memory in the volatile memory device 604 that can be individually controlled to transition from a first power consumption state to a second power consumption state. The main processing unit 612 may consist of one or more processor cores working together as a unit.

Computer system 600 further comprises a random access memory (RAM) or other dynamic storage device 604 (referred to as main memory) coupled to bus 611 for storing information and instructions to be executed by main processing unit 612. Main memory 604 also may be used for storing temporary variables or other intermediate information during execution of instructions by main processing unit 612.

Firmware 603 may be a combination of software and hardware, such as Electronically Programmable Read-Only Memory (EPROM) that has the operations for the routine recorded on the EPROM. The firmware 603 may embed foundation code, basic input/output system code (BIOS), or other similar code. The firmware 603 may make it possible for the computer system 600 to boot itself.

Computer system 600 also comprises a read-only memory (ROM) and/or other static storage device 606 coupled to bus 611 for storing static information and instructions for main processing unit 612. The static storage device 606 may store OS level and application level software.

Computer system 600 may further be coupled to a display device 621, such as a cathode ray tube (CRT) or liquid crystal display (LCD), coupled to bus 611 for displaying information to a computer user. A chipset may interface with the display device 621.

An alphanumeric input device (keyboard) 622, including alphanumeric and other keys, may also be coupled to bus 611 for communicating information and command selections to main processing unit 612. An additional user input device is cursor control device 623, such as a mouse, trackball, trackpad, stylus, or cursor direction keys, coupled to bus 611 for communicating direction information and command selections to main processing unit 612, and for controlling cursor movement on a display device 621. A chipset may interface with the input output devices.

Another device that may be coupled to bus 611 is a hard copy device 624, which may be used for printing instructions, data, or other information on a medium such as paper, film, or similar types of media. Furthermore, a sound recording and playback device, such as a speaker and/or microphone (not shown) may optionally be coupled to bus 611 for audio interfacing with computer system 600. Another device that may be coupled to bus 611 is a wired/wireless communication capability 625.

In one embodiment, the software used to facilitate the routine can be embedded onto a machine-readable medium. A machine-readable medium includes any mechanism that provides (i.e., stores and/or transmits) information in a form accessible by a machine (e.g., a computer, network device, personal digital assistant, manufacturing tool, any device with a set of one or more processors, etc.). For example, a machine-readable medium includes recordable/non-recordable media (e.g., read only memory (ROM) including firmware; random access memory (RAM); magnetic disk storage media; optical storage media; flash memory devices; etc.), as well as electrical, optical, acoustical or other form of propagated signals (e.g., carrier waves, infrared signals, digital signals, etc.); etc.

While certain exemplary embodiments have been described and shown in the accompanying drawings, it is to be understood that such embodiments are merely illustrative and not restrictive of the broad invention and that this invention is not limited to the specific constructions and arrangements shown and described, since various other modifications may occur to those ordinarily skilled in the art upon studying this disclosure. For example, the logic described above may be implemented with hardware Boolean logic in combination with other electronic components configured to achieve a specific purpose, code written in software to achieve a specific purpose, firmware, any combination of the three and similar implementation techniques. In an area of technology such as this, where growth is fast and further advancements are not easily foreseen, the disclosed embodiments may be readily modifiable in arrangement and detail as facilitated by enabling technological advancements without departing from the principals of the present disclosure or the scope of the accompanying claims.

What is claimed is:

1. An apparatus, comprising
a memory controller having two or more registers to create and track zones of memory formed within a volatile memory device, wherein the memory controller to control a power consumption state of a first zone of memory in the volatile memory device and a power consumption state of a second zone of memory in the volatile memory device on an individual basis, wherein the power consumption state of the first memory zone of the volatile memory device is different from the power consumption state of the second memory zone of the volatile memory device; and
one or more memory arrays contained within the volatile memory device.

2. The apparatus of claim 1, further comprising:
a first register to track a starting address of the first zone of memory in the volatile memory device; and
a second register to track a size of the first zone of memory in the volatile memory device.

3. The apparatus of claim 2, further comprising:
a third register to track whether the first zone of memory is available for use by an operating system.

4. The apparatus of claim 3, further comprising:
a fourth register to establish a threshold level of use of a system's volatile memory space to determine whether to make the first zone of memory available for use by the operating system.

5. The apparatus of claim 2, further comprising:
a third register to establish a threshold level of use of a system's volatile memory space to trigger a transition of the first zone of memory from a first power consumption state to a second power consumption state.

6. The apparatus of claim 1, wherein the first zone of memory and the second zone of memory have different storage capacity.

7. The apparatus of claim 1, wherein the memory controller is contained within a computing device that has a battery power supply.

8. The apparatus of claim 1, further comprising:
an input in the memory controller configured to receive a signal to set the power consumption state of the first zone of memory from an operating system power management interface that lists each zone of memory formed in the volatile memory device as a discrete device.

9. A method, comprising:
creating zones of memory in a first system volatile memory device that can be individually controlled to transition from a first power consumption state to a second power consumption state, wherein the first system volatile memory device includes one or more memory arrays;

transitioning a first memory zone in the first system volatile memory device from the first power consumption state to the second power consumption state; and transitioning a second memory zone in the first system volatile memory device from the second power consumption state to the first power consumption state.

10. The method of claim 9, further comprising:

controlling power consumption states of the zones of memory in the first system volatile memory device on an individual basis.

11. The method of claim 9, further comprising:

listing the first zone of memory in the first memory device as a discrete device in an operating system power management interface; and designating at least one of the first or second power consumption states for the first zone of memory in the operating system power management interface.

12. The method of claim 9, further comprising:

operating a first portion of the first system volatile memory device in a reduced power consumption state while operating another portion of the first system volatile memory device in a full power consumption state.

13. The method of claim 9, further comprising:

retracting a portion of the first system volatile memory device from use by an operating system until a threshold level of usage of a system volatile memory is achieved.

14. The method of claim 9, further comprising:

transitioning the first zone of memory from the first power consumption state to the second power consumption state based on upon achieving a first threshold level of use of a system volatile memory.

15. A system comprising a volatile memory device having one or more memory arrays contained within the volatile memory device; and a controller coupled to the volatile memory device; wherein the controller to create zones of memory in the volatile memory device that can be individually controlled to transition from a first power consumption state to a second power consumption state, wherein the power consumption state of the first memory zone of the volatile memory device is different from the power consumption state of the second memory zone of the volatile memory device; and a battery power supply to power the volatile memory device and the controller.

16. The system of claim 15, further comprising:

a chip set to contain the controller; and an interconnect to couple the controller to the volatile memory device.

17. The system of claim 15, further comprising:

a first register to track a starting address of a first zone of memory in the volatile memory device; and a second register to track a size of the first zone of memory in the volatile memory device.

18. The system of claim 15, further comprising:

a first register to track whether a first zone of memory is available for use by an operating system.

19. A machine-readable medium that provides instructions, which when executed by a machine, cause the machine to perform, operations:

creating zones of memory formed in a first system volatile memory device that can be individually controlled to transition from a first power consumption state to a second power consumption state, wherein the first system volatile memory includes one or more memory arrays;

transitioning a first memory zone in the first system volatile memory device from the first power consumption state to the second power consumption state; and transitioning a second memory zone in the first system volatile memory device from the second power consumption state to the first power consumption state.

20. The machine-readable medium that provides instructions of claim 19 to cause the machine to perform further operations, comprising:

controlling the power consumption states of the zones of memory in the first system volatile memory device on an individual basis.

21. The machine-readable medium that provides instructions of claim 19 to cause the machine to perform further operations, comprising:

retracting a portion of the first system volatile memory device from use by an operating system until a threshold level of usage of a system volatile memory is achieved.

* * * * *